B. E. TAYLOR.

APPARATUS FOR TREATING AND CANNING MILK.

APPLICATION FILED JUNE 6, 1921.

Reissued Aug. 2, 1921.

15,172.

4 SHEETS—SHEET 1.

Inventor

Burt E. Taylor

B. E. TAYLOR.

APPARATUS FOR TREATING AND CANNING MILK.

APPLICATION FILED JUNE 6, 1921.

Reissued Aug. 2, 1921.

15,172.

4 SHEETS—SHEET 2.

Inventor
Burt E. Taylor

B. E. TAYLOR.

APPARATUS FOR TREATING AND CANNING MILK.

APPLICATION FILED JUNE 6, 1921.

Reissued Aug. 2, 1921.

15,172.

4 SHEETS—SHEET 3.

Inventor

Burt E. Taylor

B. E. TAYLOR.

APPARATUS FOR TREATING AND CANNING MILK.

APPLICATION FILED JUNE 6, 1921.

Reissued Aug. 2, 1921.

15,172.

4 SHEETS—SHEET 4.

Inventor

Burt E. Taylor

UNITED STATES PATENT OFFICE.

BURT E. TAYLOR, OF MOUNT VERNON, NEW YORK, ASSIGNOR TO THE BORDEN COMPANY, OF NEW YORK, N. Y., A CORPORATION OF NEW JERSEY.

APPARATUS FOR TREATING AND CANNING MILK.

15,172. Specification of Reissued Letters Patent. Reissued Aug. 2, 1921.

Original No. 1,340,921, dated May 25, 1920, Serial No. 261,545, filed November 7, 1918. Application for reissue filed June 6, 1921. Serial No. 475,432.

*To all whom it may concern:*

Be it known that I, BURT E. TAYLOR, a citizen of the United States, and a resident of Mount Vernon, in the county of Westchester and State of New York, have invented certain new and useful Apparatus for Treating and Canning Milk, of which the following is a specification.

This invention relates to a process, and apparatus for carrying out the process of treating and canning milk. The object of my invention is to provide an apparatus to carry out the process of taking milk in its raw state, then sterilizing the milk, after which it is condensed, and finally placing the condensed milk in cans and sealing the cans, the entire process of condensing the milk, canning and sealing same being accomplished in a vacuum. So far as I am aware, I am the first to carry out the process of condensing and canning milk, as well as sealing the cans, while under vacuum, that is to say each step of my process is accomplished while under vacuum. At no time during the course of the milk from the sterilizer to the time that the filled sealed cans are delivered does the milk come in contact with air. By placing each one of the devices that performs the different steps in the process under vacuum, all impurities are eliminated and it is almost impossible to contaminate the milk. The drawings which accompany this specification, set forth an embodiment of the apparatus for carrying out the process of treating and canning milk while under vacuum but I do not limit myself to the precise construction herein illustrated.

Fig. 6 is an enlarged longitudinal sectional view of one of the locks; and

Fig. 7 is a sectional plan view thereof.

Figure 1:
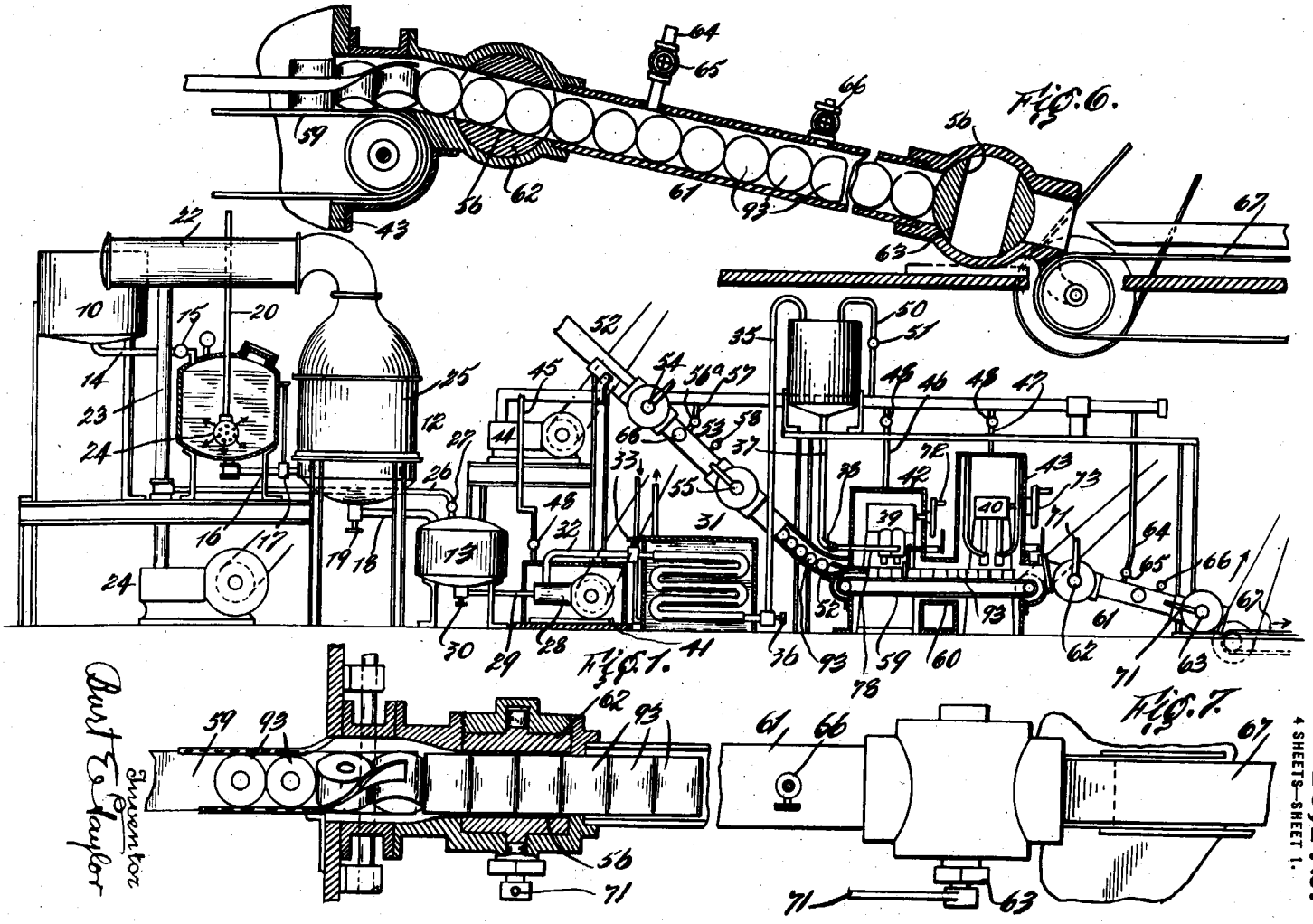
Figure 1 illustrates an assembled view diagrammatically illustrating devices for carrying out my process.

To carry out the process of treating and canning milk, I arrange a series of devices consisting of a sterilizer, a condenser, a cooling device, a filler and sealer in the order named. These are what might be termed the essentials, but in combination therewith I employ suitable pumps including a force pump and vacuum pumps, together with means to feed cans to the filler sealer and to deliver the filled and sealed cans to any suitable receiver. As illustrated in Fig. 1, I have arranged a series of devices consisting of a receiver or tank for raw cold milk indicated by 10, a sterilizer 11, a condenser 12 and storage tank 13. The receiver 10 is connected to the sterilizer 11 by a pipe line 14 having a valve 15. The sterilizer 11 is connected to the condenser 12 by a pipe line 16 having a valve 17, and the condenser 12 is connected to the storage tank 13 by a pipe line 18 having a valve 19. The sterilizer 11 is provided with a steam inlet duct 20 carrying a perforated nozzle 21 at its lower end. The condensing chamber 22 of the condenser 12 is connected by a duct 23 to a vacuum pump 24. The condenser 12 including the chamber 22 to condense vapors, and the chamber 25 to condense the sterilized milk, are well known to the art of treating milk and are therefore diagrammatically illustrated. To place the primary storage tank under vacuum, I connect same by a pipe line 26, having a valve 27, to the duct 23 of the vacuum pump 24.

After having condensed the milk, and the primary storage tank 13 is charged with the same, the said milk will be pumped out of the said tank by a pump 28 through a pipe line 29, having a valve 30, which may or may not be closed during the condensing process, into a water cooler 31 through a pipe line 32 having a valve 33. The milk passes through the water cooler which reduces its temperature to the desired extent, into a secondary storage tank 34 through a pipe line 35, having a valve 36. From the tank 34 the condensed milk is allowed to flow by gravity through a pipe line 37, having a valve 38, into a filler or pump 39, to which the cans to be filled are fed. After the cans are filled they are fed to a sealing device 40 at which station the tops are placed on the cans. After the cans have been sealed, they are carried away from the sealer and delivered for future disposition.

To operate the pump 28, filler 39 and sealer 40 under vacuum I place the said elements within casings or chambers 41, 42 and 43 respectively, said chambers being connected to a vacuum pump 44 by pipe lines 45, 46, and 47, respectively, each containing a valve indicated by 48. To place the secondary storage tank 34 under vacuum, I connect the same by a pipe line 50, having a valve 51, with the vacuum pump 44.

The cans to be filled and sealed are delivered, from any suitable source of supply (not shown), to the filler 42, and sealer 43 through a duct or elongated chamber 52, having a lock 53 located between the valves 54 and 55, having openings 56 therethrough for the passage of the cans (see Fig. 6). The lock 53 is provided with a pipe line 56 connected to the vacuum pump 44, said line having a valve 57. The lock 53 is further provided with a vacuum releasing or breaking valve 58. The cans are fed by gravity through the lock 53 and chamber 52 onto a constantly operating feeding belt 59 within the chamber 42, which feeds the cans to the filler 39. After the cans are filled, they are fed, by said belt 59 to the sealing device 40, as said belt passes from chamber 42 into chamber 43 through the communicating tunnel 60. After the cans are sealed, they are fed into a second lock 61 having valves 62 and 63 at each end thereof, said valves being provided with openings therethrough for the passage of the cans. The lock 61 is connected to the vacuum pump 44 by a pipe line 64, having a valve 65. The lock 61 is further provided with a vacuum releasing valve 66. From the lock 61 the filled and sealed cans are carried away by a feed belt 67, the cans being fed through the lock 61 by gravity.

During the course of the milk from the sterilizer to the delivery end of the second lock 61, it is entirely under vacuum. For that reason no impurities can become mingled with the same. In case any of the various devices should become defective, it can, by means of the valves contained in its connected pipe lines, be cut out of the series and repaired without breaking the vacuum in the remaining elements of the series, and I prefer to provide the condenser and its storage tank with means, independent of the rest of the device to maintain same under vacuum.

One of the features of my invention is the sterilization of milk under pressure. So far as I am aware, I am the first to sterilize milk under pressure, that is to say, in a closed vessel into which live steam is introduced. To this end I provide the sterilizing tank 11 with the steam duct 20 and perforated nozzle 21, which is of course submerged in the milk. The steam which is introduced into the milk will, due to the fact that the chamber is entirely closed, completely sterilize the milk, as all impurities will be completely eliminated far more so than if the milk is sterilized in the open, which so far as my knowledge goes, is the usual practice.

The milk in the sterilizer will be heated to the required temperature and allowed to flow into the chamber 25, which is under vacuum, at which time, its temperature will drop. The vapor which rises from the sterilized milk in chamber 25 will be condensed in chamber 22 and flow out through the duct 23 into the pump 24. This step in the condensing of sterilized milk and the drawing off of the condensed vapor is well known in this art, but the sterilization of the milk while under pressure in combination with a condensing chamber is, I believe, novel.

A further feature of my invention is the manner of feeding the cans to be filled and sealed and finally delivering the sealed cans without breaking the vacuum in the chamber through which they are fed or the chamber containing the filling and sealing devices. To accomplish this result, I provide the locks 53 and 61 which operate in the following manner:

At all times, excepting when empty cans are fed into lock 53 or allowed to gravitate from lock 61, valves 54 and 63 will be closed, and valves 55 and 62 open, the chamber 52 and chambers 42 and 43 being, of course, under vacuum. In other words, before the device is started, all chambers, tanks, etc., will be placed under vacuum, excepting, of course, supply tank 10 and sterilizer 11. To feed a supply of cans to the filler, from whence they will be fed to the sealer, valve 55 will be closed after which valve 58 will be opened to break the vacuum in lock 53. After the vacuum has been broken, which will be indicated by the gage 68, valve 54 will be opened allowing cans to gravitate through the opening 56 therein and into lock 53. After lock 53 has been filled with empty cans, valve 54 will be closed after which valve 58 can be closed. After the valve 58 has been closed, valve 57 in vacuum line 56 can be opened to place lock 53 again under vacuum. When the proper vacuum has been obtained, valve 55 can be again opened allowing the cans within the lock to gravitate into belt 59. This operation can be repeated until a desired number of cans have been stored in the duct or chamber 52. The distance between valves 54 and 55 will be approximately equal to the combined external diameters of a selected number of cans, the valves themselves accommodating two or more cans; hence the valves can be rotated without jamming the cans.

The filled and sealed cans will pass through the open valve 62 and collect in the lock 61. When the lock is filled, valve 62 will be closed and the vacuum in said lock broken by opening valve 66, after which valve 63 will be opened, thereby permitting the supply of cans to gravitate out of the lock to the feeding belt 67. After lock 61 has been emptied, valves 63 and 66 will be closed after which the lock will be again placed under vacuum, after which valve 62 will be opened again placing the lock 61 in condition to receive more cans. Windows 69 and 70 are provided in chambers 42 and 43 to enable an operator to observe the operation of filling and sealing the cans, and also to determine when a new supply of cans is needed.

The device as herein illustrated, is arranged for manual operation, but same may be operated automatically without departing from the spirit of my invention. In this instance the valves 54, 55 62 and 63 are operated manually by hand-levers 71, and the filler 39 and sealer 40 by hand-wheels 72 and 73 respectively.

Figure 2:
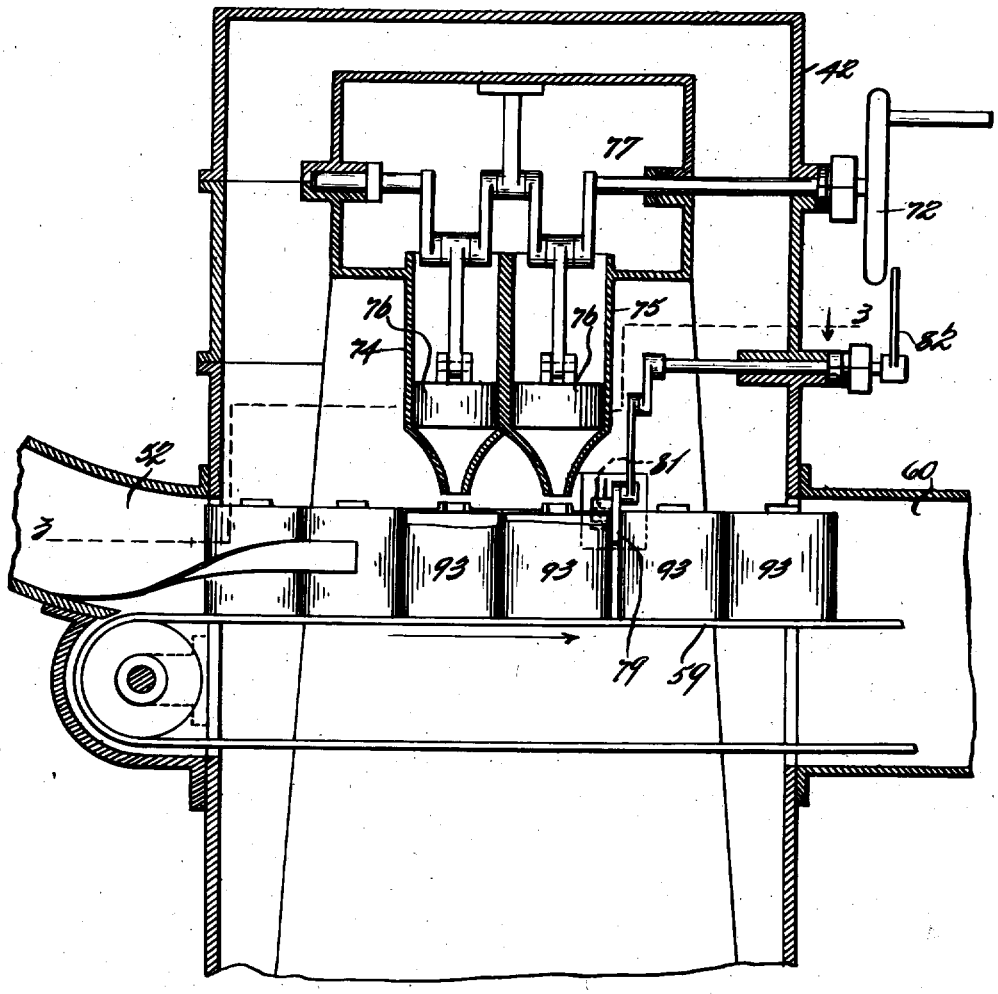
Fig. 2 is an enlarged detail sectional view of a form of filler, its containing chamber being illustrated in section.
Figure 3:
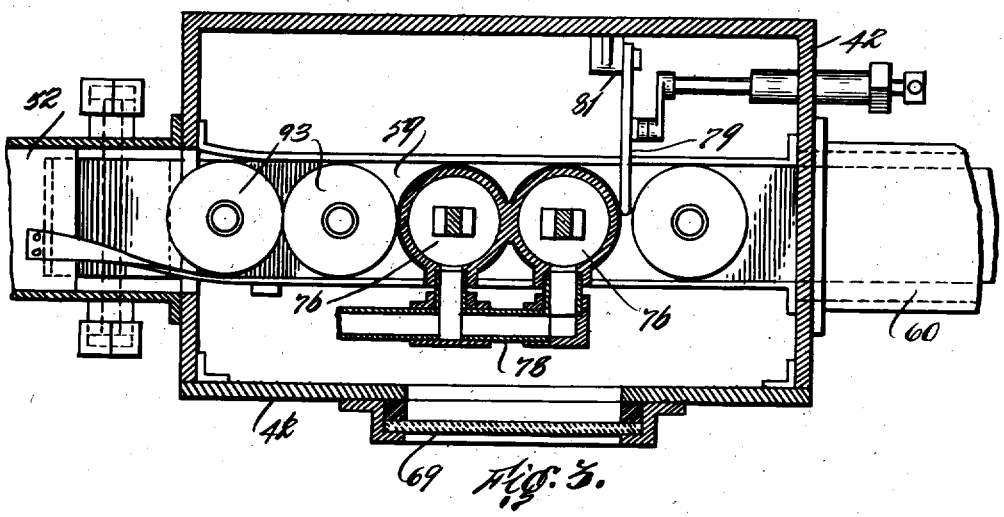
Fig. 3 is a sectional plan view thereof, the section being on a line 3—3 in Fig. 2.
Figure 5:
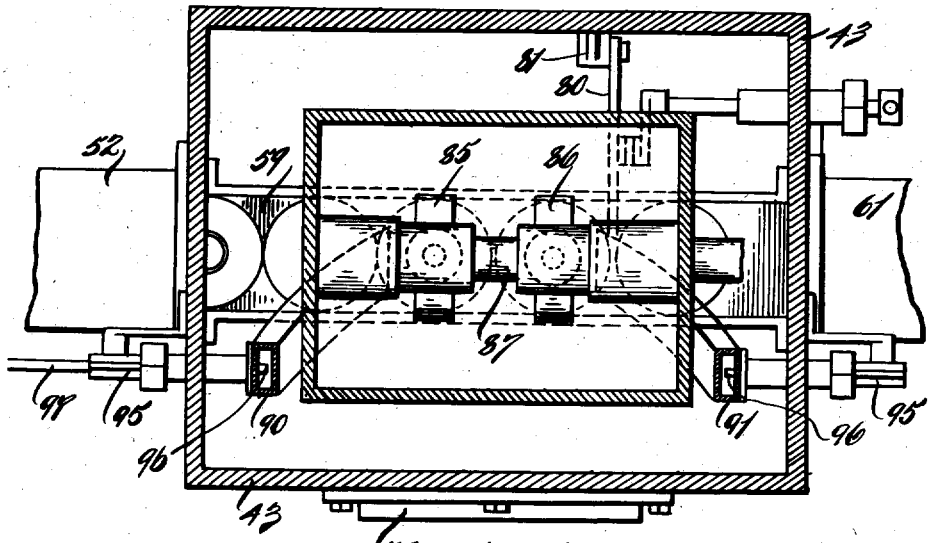
Fig. 5 is a sectional plan view thereof the section being taken on a line 5—5 in Fig. 4.
Figure 4:
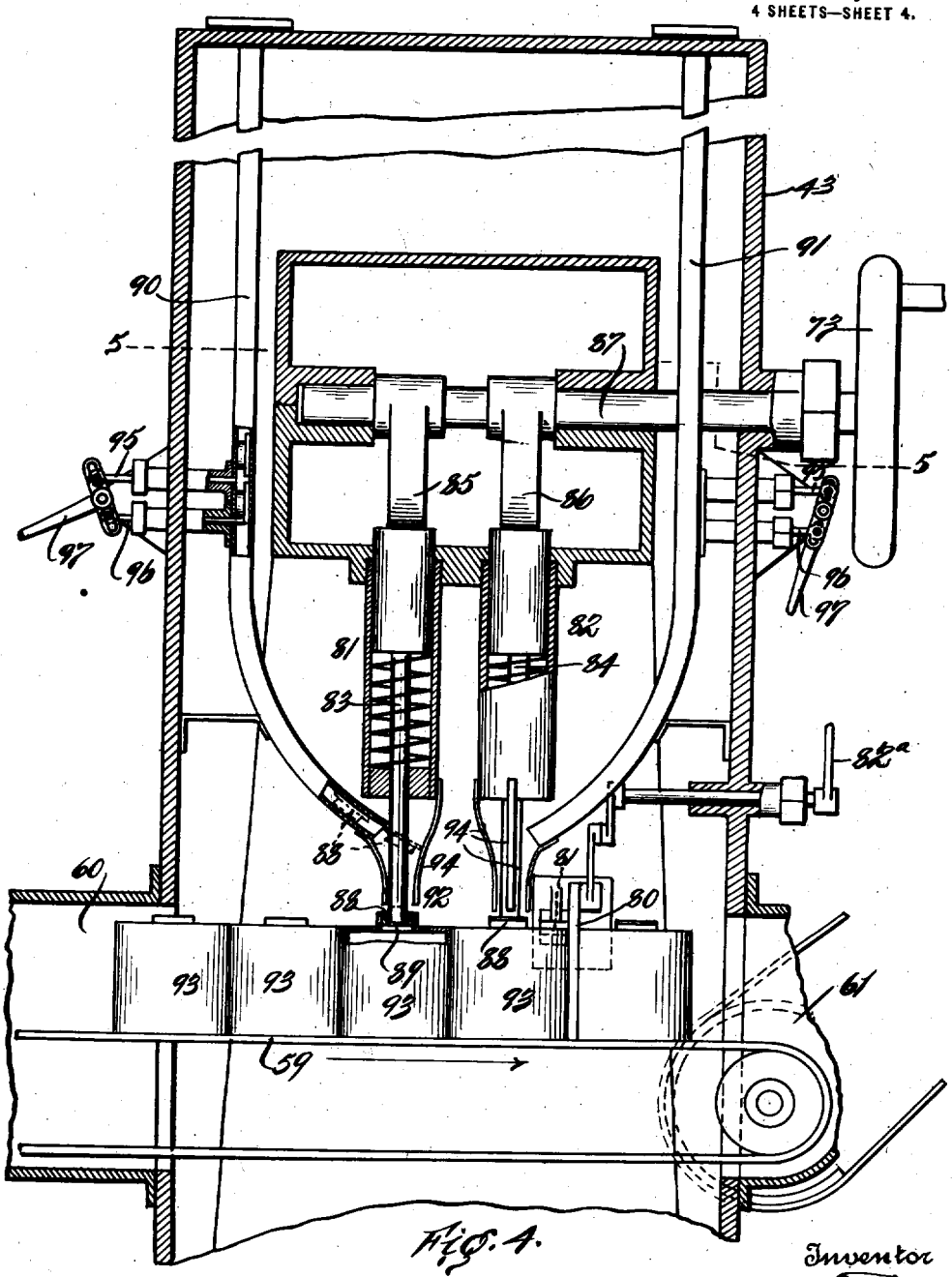
Fig. 4 is a sectional side elevation of a form of sealing device.

Any type of filler and sealer may be employed to carry out my improved process. The filler herein illustrated in Fig. 2 consists of a plurality of cylinders 74 and 75 carrying plungers 76 operated by links which connect the plungers and crank-shaft 77, said shaft being operated by the hand-wheel 72. The cylinders are placed in communication with the pipe line 37 from the storage tank 34 by a pipe line or duct 78. The cans which are fed by the belt will come in contact with a stop 79 which will properly aline the cans with respect to the nozzles of the pump cylinders. When the cans under the pumps have been filled by operating the crank-shaft 77, the stop 79 can be raised allowing the cans to be fed to a similar stop 80 adjacent the sealing devices 81 and 82 (see Fig. 4). The stops 79 and 80 may be in the form of gates pivoted at 81 to the frames of their respective devices and operated by means of handles 82.

The sealing device herein illustrated, consists of a plurality of plungers 83 and 84 operated by cams 85 and 86 on a cam shaft 87 which in turn is operated by the hand-wheel 73. The form of seal herein indicated consists of a cap 88 which is forced into the opening 89 in the cams, the caps being fed by gravity to a position under the plungers from magazines 90 and 91.

Each time that the plungers are raised, a cap will fall into the chucks 92 under said plungers. When the plungers descend the caps will be forced into the cans. When the cans, indicated by 93, under the plungers have been sealed, the stop 80 will be raised allowing the sealed cans to be fed into lock 61. I do not limit myself to any particular form of sealing means, as any one of a number of different known styles could be used.

To control the feeding of the caps 88 to the chuck 92, which consists of yieldable fingers 94, stops 95 and 96 may be employed operable by a lever 97. The stops will be arranged so that the lower stop will hold the pile. To release a cap, stop 96 will be withdrawn and stop 95 moved in to prevent more than one cap from dropping.

Having described my invention, what I claim is:—

1. In a device for canning milk, a condensing device, a can filling device, a can sealing device, means to feed the cans to the filling and sealing device, and means to place all of said devices under vacuum.

2. In a device for canning milk, a condensing device, a can filling device, a can sealing device, means to feed the cans to the filling and sealing device, means to force the milk from the condenser to the filler, and means to place all of said devices under vacuum.

3. The combination of a filling device, a chamber in communication therewith for the passage therethrough of cans to be filled, a sealing device, a duct for the passage of the filled cans connecting the filling and sealing device, a casing surrounding the filling device, a casing surrounding the sealing device, and means to maintain a vacuum in the can passages and casings surrounding the filling and sealing devices.

4. The combination of a filling device, a chamber in communication therewith for the passage therethrough of cans to be filled, a sealing device, a duct for the passage of the filled cans connecting the filling and sealing device, a casing surrounding the filling device, a casing surrounding the sealing device, means to maintain a vacuum in the can passages and casings surrounding the filling and sealing devices, and means to permit of the introduction of cans into the passage therefor without breaking the vacuum in said casings.

5. The combination of a casing, means to maintain a vacuum in said casing, a duct leading to said casing, a duct leading from said casing, both of said ducts being under vacuum, a chamber at each end of said duct normally under vacuum, and a valve mechanism carried by each of said chambers arranged to place said ducts in communication with their respective chambers without breaking the vacuum in said ducts.

6. In an apparatus for treating milk while under vacuum a duct for the passage of the cans, said duct being under vacuum, a normally closed valve at each end of said duct, a normally open valve adjacent the closed valves, means to reverse the position of the adjacent valves, to permit cans to be introduced into or taken from said duct without breaking the vacuum in said duct.

7. A device for treating and canning milk consisting of a condenser, a cooling device, a pump to force milk from the condenser to the cooling device, a can filling device, a can sealing device, a passage for cans leading to the filling device, a duct for the passage of cans connecting the filling device and sealing device, a delivery duct for the passage of cans leading from the sealing device, means to feed cans from the filling device to the sealing device, means to place all of said devices under vacuum, means to permit empty cans to be introduced into one end of the passage therefor without breaking the vacuum in said passage, and means to permit filled and sealed cans to be withdrawn from the end of the delivery duct without breaking the vacuum therein.

8. A device for treating and canning milk consisting of a condenser, a cooling device, a pump to force milk from the condenser to the cooling device, a can filling device, a can sealing device, a passage for cans leading to the filling device, a duct for the passage of cans connecting the filling device, and sealing device, a delivery duct for the passage of cans leading from the sealing device, means to feed cans from the filling device to the sealing device, means to place all of said devices under vacuum, means to permit empty cans to be introduced into one end of the passage therefor without breaking the vacuum in said passage, means to permit filled and sealed cans to be withdrawn from the end of the delivery duct without breaking the vacuum therein, and means to break the vacuum in any one of the devices without breaking the vacuum in the remaining devices.

9. The combination of a chamber, means to maintain said chamber under vacuum, and means to introduce receptacles into said chamber without breaking the vacuum therein.

10. The combination of a chamber, means to maintain said chamber under vacuum, a lock connected at one end thereof to said chamber, means to maintain said lock under vacuum, and means forming part of said lock arranged to permit of the introduction into said lock of receptacles to be introduced into said chamber without breaking the vacuum in said chamber.

11. In apparatus for filling cans with milk and thereafter capping and sealing them, the combination of a casing containing a normally closed chamber having a thereinto inlet for empty, and therefrom outlet for filled and capped cans, means to open and close said inlet and outlet; a can-filling device, a cap-placing and a cap-sealing device located in said chamber; means to feed the empty cans into the chamber, means to therethrough feed them successively to the filling and sealing devices and therefrom out of the chamber; means to bring the cans into, and during their filling and sealing detain them in, alinement with the filling and sealing devices, means to actuate the filling and sealing devices while the cans are therewith alined, means to pump air out of the chamber during closure of its said inlet and outlet; and means to, through said inlet and outlet, permit the cans to enter and withdraw from the chamber without admitting air.

12. In apparatus for filling cans with milk and thereafter capping and sealing them, the combination of a casing containing a normally closed chamber having a thereinto inlet for empty, and therefrom outlet for filled and capped cans; means to open and close said inlet and outlets; a can-filled device, a cap-placing and a cap-sealing device located in said chamber; means to, by aid of gravity, feed the empty cans into the chamber; means to therethrough feed them successively to the filling and sealing devices and therefrom out of the chamber; means to bring the cans into, and during their filling and sealing detain them in, alinement with the filling and sealing devices; means to actuate the filling and sealing devices while the cans are therewith alined; means to pump air out of the chamber during closure of its said inlet and outlet; and means to, through said inlet and outlet, permit the cans to enter and withdraw from the chamber without admitting air.

13. In apparatus for filling cans with milk and thereafter capping and sealing them, the combination of a casing containing a normally closed chamber having a thereinto inlet for empty, and therefrom outlet for filled and capped cans; means comprising rotatable valve members having openings for passage of the cans therethrough to open and close said inlet and outlet; a can-filling device; a cap-placing and a cap-sealing device located in said chamber; means to feed the empty cans into the chamber; means to therethrough feed them successively to the filling and sealing devices and therefrom out of the chamber; means to bring the cans into, and during their filling and sealing detain them in, alinement with the filling and sealing devices; means to actuate the filling and sealing devices while the cans are therewith alined; means to pump air out of the chamber during closure of its said inlet and outlet; and means to, through said inlet and outlet, permit the cans to enter and withdraw from the chamber without admitting air.

14. In apparatus for filling cans with milk and thereafter capping and sealing them, the combination of a casing containing a normally closed chamber having a thereinto inlet for empty, and therefrom outlet for filled and capped cans; a can-filling device, a cap-placing and a cap-sealing device located in said chamber; means to feed the empty cans into the chamber; means to therethrough feed them successively to the filling and sealing devices and therefrom out of the chamber; means to bring the cans into, and during their filling and sealing detain them in, alinement with the filling and sealing devices; means to actuate the filling and sealing devices while the cans are therewith alined; means to pump air out of the chamber during closure of its said inlet and outlet; and in said outlet and inlet for cans an air lock comprising a plurality of rotatable, cylindrical valve members each having an opening for passage of the cans therethrough which accommodates two or more cans.

BURT E. TAYLOR.

Witnesses:

WILLIAM T. HOPKINS,
JEANETTE CRANOW.